United States Patent [19]

Haag

[11] Patent Number: 4,711,434
[45] Date of Patent: Dec. 8, 1987

[54] SPRING DISC

[76] Inventor: Donald L. Haag, 1302 E. 18th St., Sterling, Ill. 61081

[21] Appl. No.: 882,410

[22] Filed: Jul. 7, 1986

[51] Int. Cl.⁴ .............................................. F16F 1/02
[52] U.S. Cl. ................................... 267/161; 267/163; 267/165
[58] Field of Search ............... 267/158, 161, 163, 164, 267/165; 403/136, 138

[56] References Cited

U.S. PATENT DOCUMENTS

| | | | |
|---|---|---|---|
| 2,100,464 | 11/1937 | Almen et al. | 192/68 |
| 2,356,310 | 8/1944 | Gass | 261/161 |
| 2,983,503 | 5/1961 | Haussermann | 267/161 |
| 3,017,171 | 1/1962 | Mather | 267/165 |
| 3,868,100 | 2/1975 | Maucher | 267/162 |

FOREIGN PATENT DOCUMENTS

| | | |
|---|---|---|
| 209308 | 6/1956 | Australia . |
| 2515750 | 10/1976 | Fed. Rep. of Germany . |
| 615295 | 3/1976 | U.S.S.R. . |

Primary Examiner—Joseph Falk
Attorney, Agent, or Firm—Leydig, Voit & Mayer

[57] ABSTRACT

A solid spring disc is made of resiliently yieldable material and is shaped as a shallow cone whose upper and lower surfaces are corrugated and are defined by a plurality of angularly spaced triangular segments of identical size and shape and disposed in adjoining side-by-side relation. The substantially linear force/deflection range of the spring disc is significantly longer than that of a conventional Belleville spring of comparable size and thus the spring disc possesses a substantially lower spring rate.

2 Claims, 11 Drawing Figures

CALCULATOR BUTTON SPRING

HYDRAULIC

MECHANICAL

ELECTRICAL

LIGHT

SPRING DISC

BACKGROUND OF THE INVENTION

This invention relates to a resiliently yieldable spring disc and, more particularly, to a spring disc which constitutes an improvement over a conventional Belleville spring.

As is well known, a Belleville spring consists of an apertured disc made of spring metal and having a generally frustoconical shape. When force is applied to the spring in an axial direction, the spring deflects and initially exerts a relatively high resistive force which increases rapidly as a non-linear function of the deflection of the spring. With continued deflection of the spring, the resistive force exerted by the spring decreases gradually as a substantially linear function of deflection until the spring toggles and once again exerts a force which increases non-linearly with deflection. With many applications, only the linear force/deflection characteristics of the spring are usable. Also, in many instances, one or more pairs of Belleville springs are stacked back-to-back in order to reduce the overall spring rate.

SUMMARY OF THE INVENTION

The general aim of the present invention is to provide a new and improved spring disc which, when compared with prior springs having the same linear force/deflection range, is much smaller in size and requires far less material.

Another object of the invention is to provide a spring disc capable of acting with substantially the same spring rate as two back-to-back Belleville springs while being significantly less complex and requiring less material and while eliminating the friction resulting from the use of two springs.

Still a further object of the invention is to provide a spring disc which is relatively easy to design and manufacture.

These and other objects and advantages of the invention will become more apparent from the following detailed description when taken in conjunction with the accompanying drawings.

DETAILED DESCRIPTION OF THE PREFERRED EMBODIMENT

Figure 1:
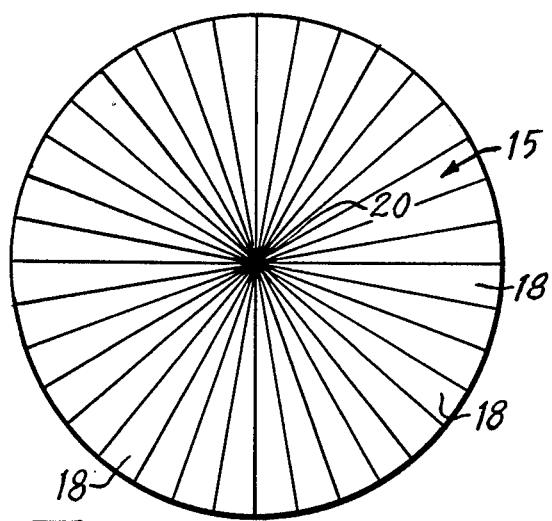
FIG. 1 is a top plan view of a new and improved spring disc incorporating the unique features of the present invention.
Figure 2:
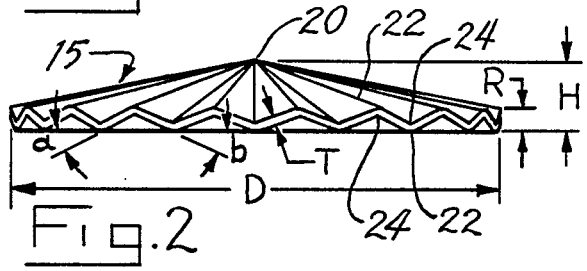
FIG. 2 is a side elevational view of the disc.
Figure 3:
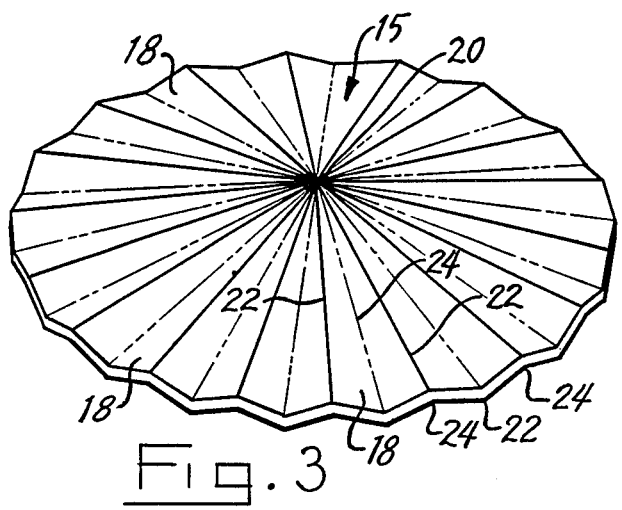
FIG. 3 is a perspective view of the disc.

The present invention contemplates the provision of a new and improved spring disc 15 which possesses a lower substantially linear force/deflection gradient than prior springs of the same size. The disc 15 is shown in FIGS. 1 to 3 and herein is formed from an initially flat and circular blank 16 (FIG. 4) of spring metal such as brass or steel or other resiliently yieldable material. Importantly, the entirety of the blank is solid and imperforate.

The sheet metal blank is formed into a shallow and upright right circular cone having a generally convex upper surface and a generally concave lower surface. Each surface is defined in its entirety by an array of angularly spaced V-shaped or triangular segments 18 of identical size and shape disposed in adjoining side-by-side relation. As is most clearly apparent from FIGS. 1 to 3, each of the triangular segments includes a pair of side margins includes an upper apex located precisely at the upper apex 20 of the cone and further includes a lower base extending along and defining the periphery of the disc 15. Adjoining segments 18 not only slope upwardly from the periphery of the cone to the apex 20 thereof but also are inclined at equal oblique angles a and b relative to a horizontal plane extending perpendicular to the axis of the cone. As a result, the upper and lower surfaces of the disc are corrugated, that is to say, alternating crests 22 and valleys 24 are spaced angularly from one another around each surface of the disc. Adjoining side margins of adjoining segments define a crest on one side of the disc and a valley on the opposite side of the disc. Each crest and valley radiates continuously from the apex 20 of the cone, the disc being totally imperforate at the apex.

The exemplary spring disc 15 shown in FIGS. 1 to 3 has a diameter D of about 3¼", a base-to-apex height H of about ⅜", a material thickness T of about 1/16" and a vertical dimension R of about 5/32" from the outer end of a crest 22 on the lower surface of the disc to the outer end of a crest on the upper surface of the disc. Thirty-six flat and planar triangular segments 18 are formed in the present disc and the outer end of each is inclined relative to the horizontal at an angle a or b of about eleven degrees. The number of segments may, of course, vary depending upon the size and application of the disc.

Figure 5:
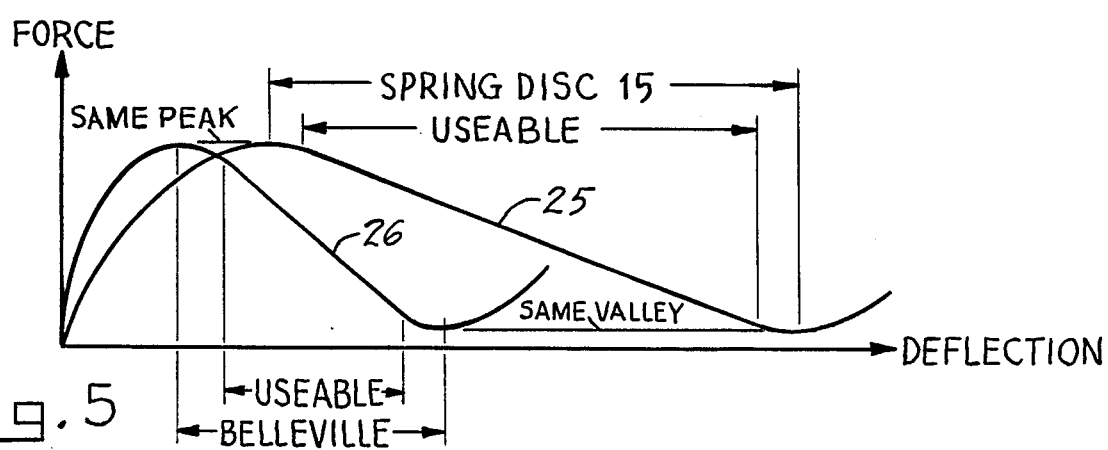
FIG. 5 is a graph comparing the force/deflection characteristic curves of the spring disc of the invention and of a conventional Belleville spring of the same diameter and thickness.

The curve 25 of FIG. 5 is the force/deflection characteristic curve of the spring disc 15 of the present invention. When the disc is deflected axially, the resistive force exerted by the disc initially increases sharply and non-linearly relative to the distance through which the disc is deflected. After the disc has been deflected through a predetermined distance, the resistive force peaks and then decreases in a substantially linear manner as a function of deflection as deflection of the disc is continued. With still further deflection, the disc toggles and thereafter the resistive force of the disc once again sharply increases as a non-linear function of deflection.

FIG. 5 also illustrates the force/deflection characteristic curve 26 of a conventional smooth surfaced and apertured Belleville spring made of the same material, having the same thickness and diameter and having the same cone angle as the spring disc 15 of the invention. As is apparent, the resistive force exerted by the two springs peaks at the same magnitude and decreases to the same magnitude before starting to increase again. In the case of the spring disc 15, however, the usable and substantially linear force/deflection range is approximately twice that of the conventional Belleville spring. If the spring disc of the invention is constructed so as to have approximately the same usable and linear force/deflection range as illustrated by the curve 26 for the Belleville spring, the diameter and thickness of the spring 15 may be approximately one-half the diameter and thickness of the Belleville spring, the circular area required by the present spring is only about one-fourth that required by the Belleville spring, and the present spring disc requires only about one-eighth of the material of the conventional Belleville spring. Accordingly, the present spring disc results in a significant saving in material and is capable of being used in applications having limited area for accommodating the spring. In addition, a single spring disc 15 of the invention exhibits substantially the same low spring rate as two back-to-back Belleville springs each having the same diameter and thickness as the disc 15. Accordingly, the spring disc 15 may be used to obtain a low spring rate with less complexity and with less material than required by a pair of back-to-back Belleville springs. Moreover, the spring disc 15 eliminates the friction produced by back-to-back Belleville springs.

Figure 4:
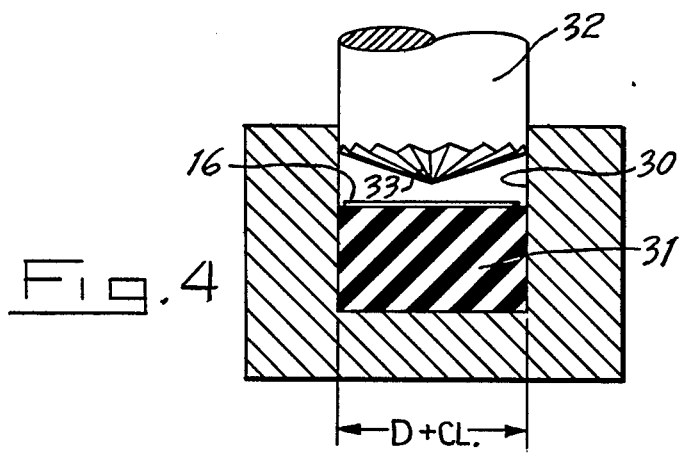
FIG. 4 is a a schematic view, partially in crosssection, of explary tooling for making the disc.

The spring disc 15 may be manufactured in a comparatively simple manner as exemplified by FIG. 4 where the metal blank 16 is shown as being located with radial clearance in a die cavity 30 and backed by a block 31 made of rubber or other readily compressible material. Slidable within the die cavity is a punch 32 having a conical and corrugated face 33 which is generally complementary in shape to the shape of the underside of the ultimate disc 15. When the punch is impacted downwardly against the blank 16, the metal thereof flows into the form of the conical and corrugated spring disc, the underlying block 31 yielding to allow the metal to flow into conformance with the face 33 of the punch. As an alternative to using the punch 32 to form a metal spring disc 15, a disc made of plastic or the like may be formed in a suitably shaped injection mold.

Figure 6:
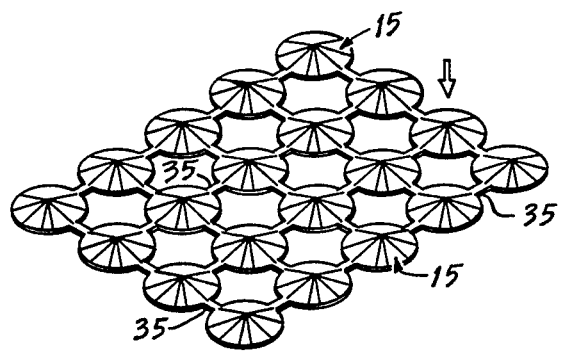
FIG. 6 is a perspective view of several spring discs ganged together to form a calculator spring.

FIGS. 6 to 11 illustrate different applications for the spring disc 15. In FIG. 6, several molded spring discs 15 have been shown as connected together by integral webs 35 so as to form a spring for returning the buttons of a calculator. The increased movement permitted by the spring produces an improved feel to the fingers of the operator of the calculator.

Figure 7:
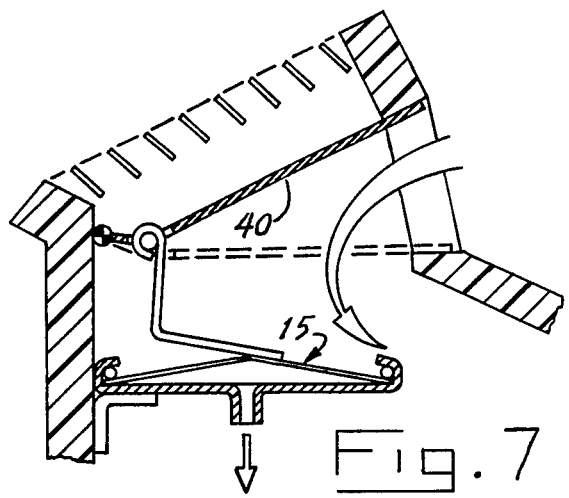
FIGS. 7 to 11 are schematic views showing various advantageous applications of the spring disc of the invention.

In FIG. 7, the spring disc 15 is shown as forming part of a flow controller. When vacuum is applied to the underside of the disc, the latter allows a pivoted vane 40 to swing clockwise and change the path of air flow past the vane. Upon release of the vacuum, the spring disc snaps upwardly and returns the vane to the position shown in FIG. 7.

Figure 8:
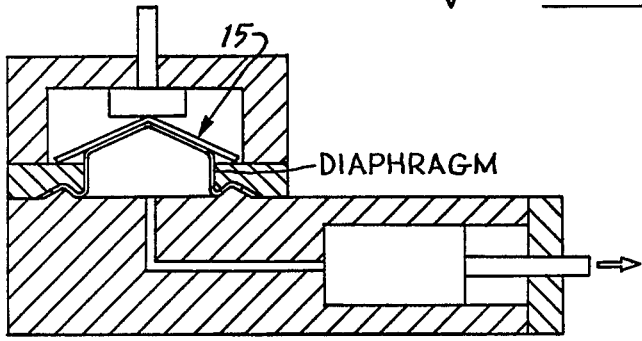
Figure 9:
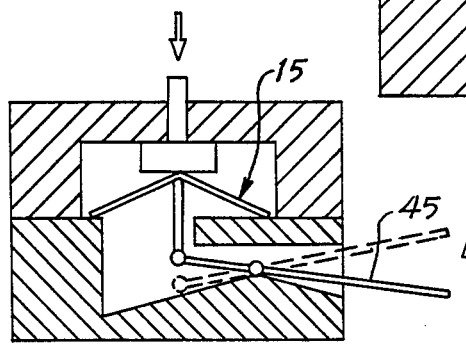
Figure 10:
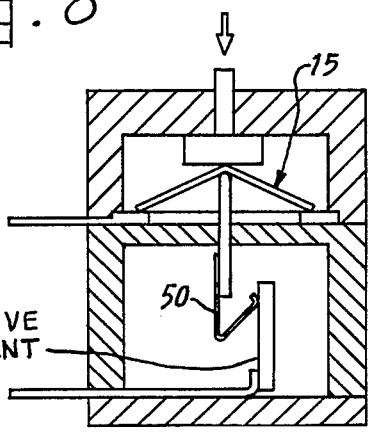
Figure 11:
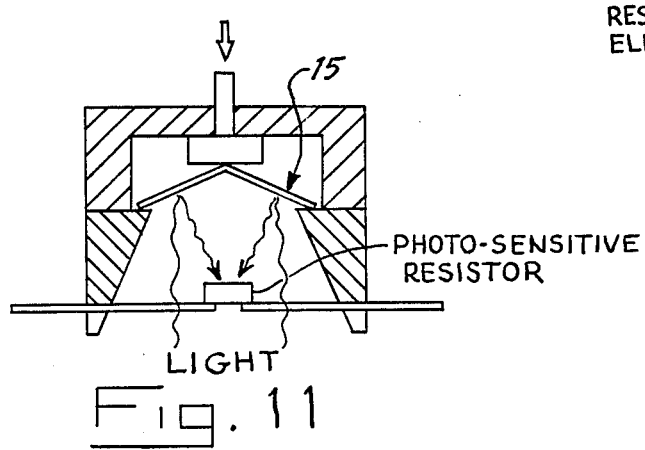

FIG. 8 shows the spring disc in a hydraulic application, the disc acting against a diaphragm and acting to pressurize fluid when deflected downwardly. In FIG. 9, the spring disc is shown in conjunction with a mechanical lever 45, the increased movement of the disc adding to the input-output amplification. FIG. 10 illustrates the spring disc in an electrical application where the increased movement of the slider 50 along a resistive element produces greater accuracy. Finally, FIG. 11 shows the spring disc 15 being used as a reflective member to focus a light source relative to a photo-sensitive resistor used in an electronic circuit for control purposes.

I claim:

1. A solid spring disc made of resiliently yieldable material and having first and second oppositely facing surfaces, said disc having a generally circular periphery and being shaped as a shallow right circular cone, each surface of said disc being defined by a plurality of angularly spaced and flat and planar triangular segments of identical size and shape disposed in adjoining side-by-side relation, each of said triangular segments having a pair of side margins, having an apex located at the apex of said cone and having a base located opposite the apex of the segment and extending along the periphery of said disc, and adjoining segments being inclined at equal oblique angles relative to a plane extending perpendicular to the axis of said cone and being inclined relative to said plane in such a direction that adjoining side margins of adjoining segments define a crest on one surface of said disc and define a valley on the opposite surface of said disc, said crests and valleys alternating with one another around each surface of said disc.

2. A solid spring disc made of resiliently yieldable material and having a generally circular periphery, said disc being shaped as a shallow and upright right circular cone and having a generally convex upper surface and a generally concave lower surface, each surface of said disc being defined in its entirety by an array of angularly spaced and flat and planar triangular segments of identical size and shape disposed in adjoining side-by-side relation, each of said triangular segments having a pair of side margins, having an upper apex located at the apex of the cone and having a lower base extending along the periphery of said disc, adjoining segments being inclined at equal angles relative to a horizontal plane extending perpendicular to the axis of the cone and being inclined relative to said plane in such a direction that adjoining side margins of adjoining segments define a crest on one surface of said disc and define a valley on the opposite surface of said disc, said crests and valleys alternating with one another around each surface of said disc, and each of said crests and valleys radiating continuously from the apex of the cone.

* * * * *